United States Patent Office 2,925,091
Patented Feb. 16, 1960

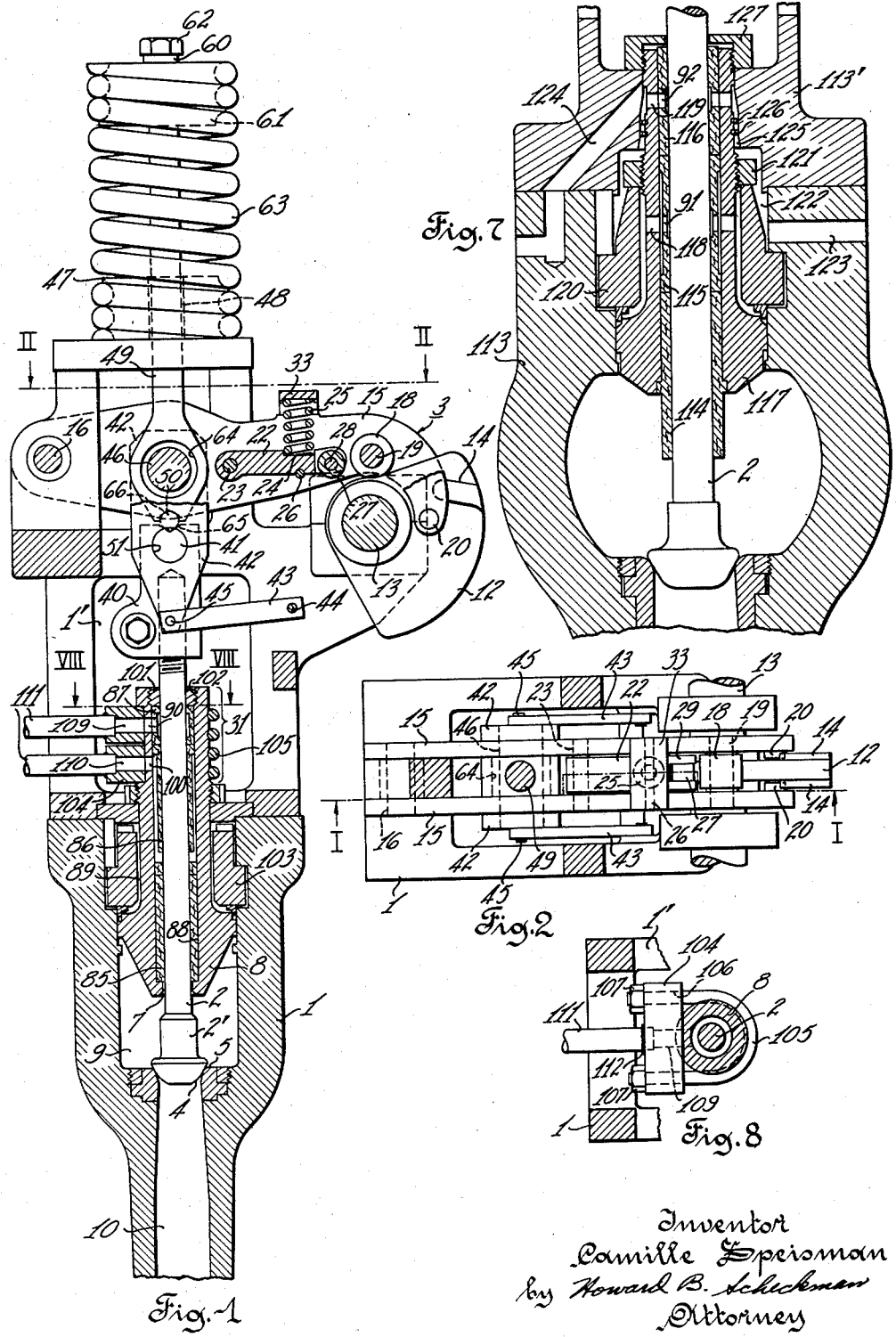

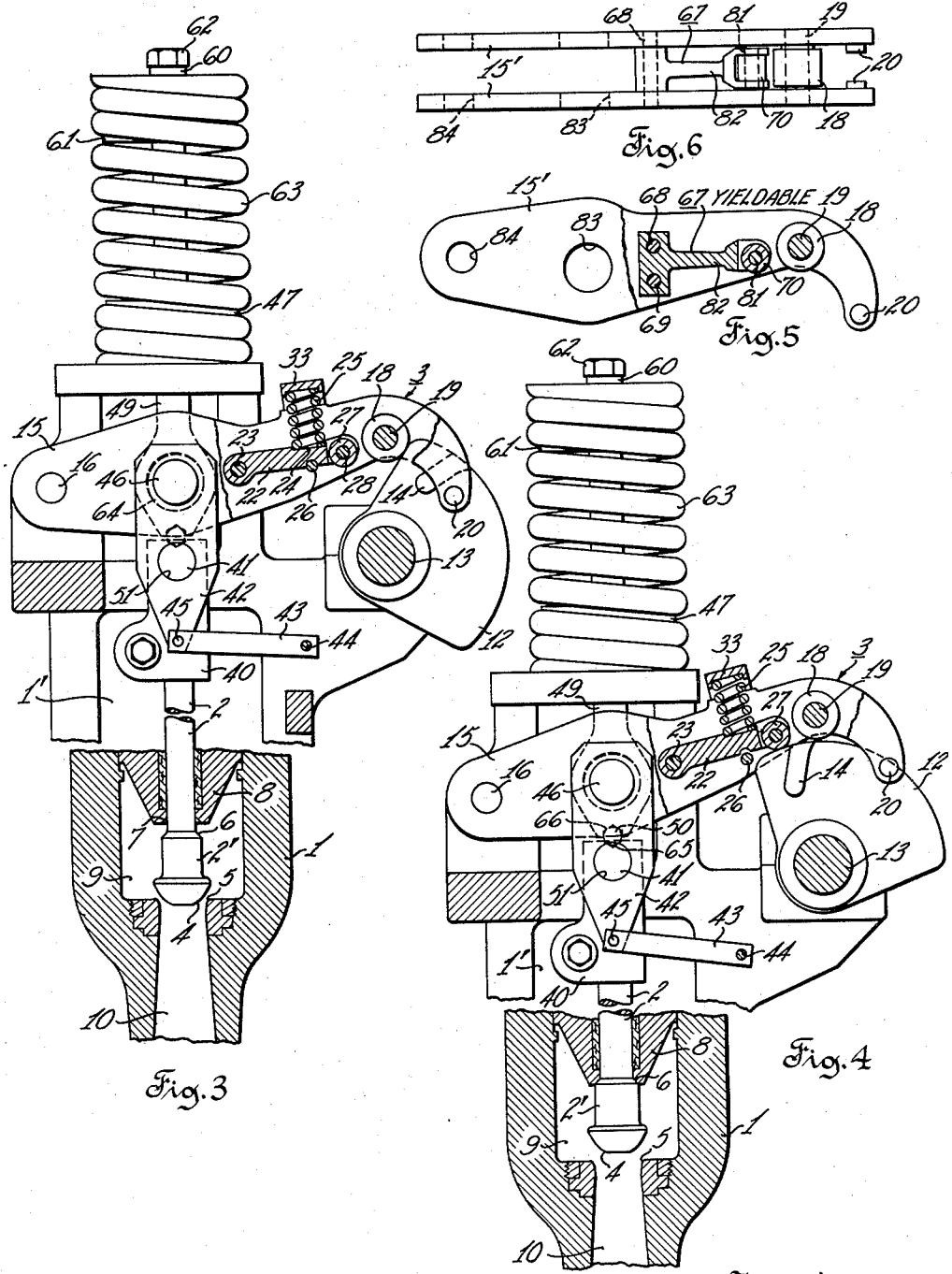

2,925,091

DOUBLE ACTING CAM FOLLOWER

Camille Speisman, Milwaukee, Wis., assignor to Allis-Chalmers Manufacturing Company, Milwaukee, Wis.

Application March 7, 1956, Serial No. 569,984

9 Claims. (Cl. 137—312)

This invention relates to a valve and mechanism for controlling the leakoff of a valve of a high pressure high temperature fluid turbine.

The usual method of regulating the amount of steam for a turbine is to provide a plurality of valves in the steam chest and open the valves seriatim, using the valve that is in the process of being opened for fine regulation.

The valves are controlled by a cam carried on a shaft. A cam for each valve is placed at a different angle around the shaft. As the shaft rotates it will open one valve, as that valve reaches its fully opened state, a second valve will have begun to open, the first valve when fully opened will reach a dwell on its cam and remain open while the shaft rotates to open the second valve. This is repeated for each valve, with the valve which is being opened used for fine regulation.

In previous fluid turbines, not subject to high pressures and high temperatures, leakoff, that is the portion of the fluid which escapes from the steam chest between the packing and the valve shaft, was not large. In the prior art turbines the leakoff was permitted on the outside of a pressure bonnet which encircled the packing. This necessitated employing a heavy valve body around the pressure bonnet to contain the leakoff. Openings were provided in the valve body to provide an exit for the leakoff, and the leakoff was used, to run auxiliary equipment, heating, or could be piped to the low pressure turbine, and was not objectionable. However, in present day high pressure high temperature turbines, the leakoff has become appreciable and unless decreased lowers the efficiency of the turbine.

To decrease the amount of leakoff of the valve when it is open, the valve has been backseated, that is, moved back to a position wherein the valve shaft head serves to close the passage between the packing and valve shaft. The difficulty in maintaining accurate tolerances of the elements which are used to move the valve, particularly when it is recalled that the elements will elongate at various temperatures, has made it almost impossible to commercially employ this arrangement. Further, any device employed to backseat the valve must also be used for regulation of the steam between the open and closed positions of the valve, and this requires direct positive control of the valve.

This invention provides a drive mechanism which will provide a positive and direct drive of the valve when the valve is used to regulate the amount of steam; and will provide a firm back seat by compensating for any inaccuracies in the dimensions of the elements which move the valve. This invention further provides an arrangement for confining leakoff, permitting use of a simpler mechanism.

An object of this invention is to provide a valve which is under positive drive during its period of regulation, and yielding drive when backseated.

Another object of this invention is to provide an improved arrangement for handling leakoff of a back seated valve, permitting easy maintenance, assembly, and fabrication.

Other objects and advantages will appear from the following description considered in conjunction with the attached drawing, in which:

Fig. 1 is a sectional view taken on line I—I of Fig. 2 illustrating the valve in closed position;

Fig. 2 is a sectional view taken on line II—II of Fig. 1, illustrating the cam follower and its relationship with the frame and the cam;

Figs. 3 and 4 are similar to Fig. 1, and illustrate the cam follower in various positions in the process of backseating the valve;

Fig. 5 is a modification of the came follower, partially in section, wherein a flexible bar is employed;

Fig. 6 is a plan view of Fig. 5;

Fig. 7 is an illustration of the prior art, showing the old arrangement for providing for leakoff; and Fig. 8 is a sectional view of Fig. 1 taken on line VIII—VIII of Fig. 1, showing the arrangement for attaching the flange to the bonnet, and the attachment of the tubes to the flange.

Referring to Fig. 1 there is disclosed a valve body 1, which has an open portion 1' exposed to the atmosphere, a valve shaft 2 is carried in valve body 1. Said valve shaft 2 is moved by drive mechanism 3 (indicated by the arrow, Fig. 1). Said valve shaft 2 has a head portion 2' which has a front face 4 and a back face 6 (Figs. 3 and 4). Front face 4 engages a balance seat 5 on the valve body 1 to close the valve, and the back face 6 of valve shaft head 2' engages a back seat 7 on a pressure bonnet 8 carried in valve body 1 to open the valve. Valve shaft head 2' reciprocates in a steam chest 9 provided in valve body 1.

When surface 4 of valve shaft head 2' abuts balance seat 5, valve shaft head 2' stops the supply of steam from steam chest 9 to an entrance 10 leading to the turbine. Steam in steam chest 9 passes into entrance 10 when valve head 2' is moved away from the balance seat 5 and steam is permitted to drive the turbine. Valve head 2' is backseated against seat 7 when entrance 10 is fully opened. Valve head 2' regulates the amount of steam between the position in which it engages the balance seat 5 to close the entrance 10, and the position in which it engages back seat 7, and fully opens the entrance 10.

Valve shaft 2 is reciprocated by a driver and a driven member. The driver comprises a cam 12 fixedly attached to a shaft 13 (Figs. 1 and 2) which is supported for rotation in valve body 1. Said shaft 13 is rotated by any conventional means to which it is desired to make the turbine responsive, a speed governor for example. The driven member comprises a bifurcated cam follower 15 (Figs. 1 and 2) which is pivotally mounted for rotation in valve frame 1 by pivot 16.

Cam follower 15 carries a contact means which provides positive movement of the follower. The contact means comprises a roller 18 which is rotatably mounted on the cam follower by a shaft 19 which extends between the bifurcated members of the cam follower 15.

Cam follower 15 also carries a yieldable means, or secondary cam follower, which when driven by cam 12, provides yielding movement of follower 15. The yieldable means comprises an arm 22 having one end pivotally mounted between the bifurcated portions of the cam follower 15 by a pivot 23. The other end of arm 22 is provided with a yoke shaped portion 29 (Fig. 2). A roller 27 is pivotally mounted at 28 (Fig. 1) between the yoke shaped portion 29. Extending between and connected to the bifurcated portions of follower 15 is a spring seat 33. Arm 22 contains a depression 24 (Fig. 1) in its surface. A spring 25 is provided to bias arm 22 clockwise about pivot 23 as viewed in Fig. 1. One end of spring 25 engages spring seat 33 and the other end engages the depression 24 in arm 22. Connected between the bifurcated portions of the cam follower 15 is a stop member 26. Arm 22 is resiliently urged by spring 25 against stop member 26. When said arm 22 is rotated counter clockwise about pivot 23, as viewed in Fig. 1, it will abut against spring 25 to transmit the force from arm 22 through spring 25 to spring seat 33, and in turn to bifurcated cam follower 15.

The relative location of rollers 18 and 27 is such that rollers 18 and 27 will be successively engaged by cam 12 as cam 12 is rotated counter clockwise, as illustrated in Figs. 1, 3 and 4. Cam 12 will first drive cam follower 15 through roller 18 to provide a positive drive for valve shaft 2, to move the surface 4 on valve shaft head 2' away from balance seat 5 to which surface 4 may stick, and also provide for positive regulation. As cam 12 continues to rotate, and referring to Fig. 4, cam 12 will move into engagement with roller 27 and out of engagement with roller 18. As roller 18 is moved out of engagement with cam 12, roller 27 takes up the load through spring 25. As valve face 6 backseats against back seat 7 of pressure bonnet 8, the resilient connection can take up any variations in size of the parts which move valve shaft 2, to provide a firm back seat.

To provide for positive movement of the valve from its back seat 7, in case the back face 6 sticks to the back seat 7, cam 12 is provided with abutments 14. Complementary projections 20 are provided on the end of cam follower 15. As cam 12 rotates clockwise, abutments 14 will engage projections 20 and move cam follower 15 to provide positive movement of the back face 6 from the back seat 7.

Cam follower 15 may be connected to valve shaft 2 by any conventional linkage arrangement. Referring to Figs. 1 and 2 a linkage arrangement which may be employed to move valve shaft 2 is disclosed. A clamp 40 attached to the end of valve shaft 2 is provided with a fixed trunnion 41 projecting from each side of said clamp. The trunnions are carried in openings 51 in a trunnion carrier 42. A trunnion carrier is provided on each side of cam follower 15 as can be seen in Fig. 2. A link 43 is pivotally supported by a pivot 44 from each side of valve body 1. The opposite end of each link 43 is rotatably connected by a pivot 45 to the end of each trunnion carrier 42. The other end of each trunnion carrier 42 is pivoted to bifurcated cam follower 15 through a pivot 46 which is carried intermediate the ends of cam follower 15. Pivot 46 extends through the bifurcated sides of cam follower 15 and into trunnion carriers 42 on each side of the bifurcated cam follower. The distance between pivots 44 and 45 of the link 43 is equal to the distance between pivots 16 and 46 of the cam follower 15.

As cam follower 15 rotates about pivot 16 one end of trunnion carrier 42 moves in an arc about pivot 16 and the other end of trunnion carrier 42 moves in an arc above pivot 44. The two arcs will compensate, that is, while one end of the carrier is being raised the other end is being correspondingly lowered. Due to this, the carrier 42 while being transported will pivot about a point which does not move transverse to the valve shaft. This point on the trunnion carrier 42 is provided with the openings 51 in which the trunnions 41 of the clamp 40 are carried. The center portion of trunnion carrier 42 which carries trunnion 41 therefore is moved in a straight line, and the valve shaft 2 will be correspondingly moved in a straight line.

Referring to Fig. 1, means are provided to hold cam follower 15 in engagement with cam 12 and also urge valve shaft 2 downwardly. The means comprises a spring arangement. Affixed to the valve body is a spring anchor 47 having an opening 48. A spring rod 49 is movably mounted in said opening 48 in spring anchor 47. Secured on the end of the spring rod 49 is a second spring anchor 61. Said second spring anchor 61 is fastened by a bolt 62 extending through a lock washer 60 and threaded into spring rod 49. Secured to anchors 47, 61 is a spring 63. Spring 25 is made stronger than spring 63, otherwise spring 25 would be compressed when driving against spring 63. Spring 63 attempts to contract and urge spring anchor 61 and spring rod 49 downward as viewed in Fig. 1. Spring rod 49 (Fig. 1) is provided with an opening 64, through which pivot 46 extends, said opening is larger than pivot 46. As can be seen in Fig. 2 spring rod 49 is carried between the bifurcated portions of cam follower 15. Spring rod 49 has an opening 66 in the end facing the clamp 40, in which a ball 50 is carried. Clamp 40 has a complementary opening 65 in the end of the clamp. Spring 63, referring to Fig. 1, urges spring rod 49 downward to move ball 50 into opening 65 in clamp 40 to urge valve shaft 2 downward and move valve shaft head 2' into engagement with balance seat 5.

Cam follower 15 is held against cam 12 through the action of spring rod 49 abutting clamp 40 which in turn urges trunnion carriers 42 and pivot 46 downward, as seen in Fig. 1.

Referring to Figs. 5 and 6, a modification of the driven means is disclosed. To facilitate the understanding of the modification, like parts previously described will be similarly numbered.

The driven means comprises a cam follower 15' which is bifurcated (Fig. 6). Cam follower 15' carries a contact means which comprises a roller 18 which is rotatably mounted on a shaft 19 extending between the bifurcated portions of cam follower 15'. Carried between the bifurcated portions of cam follower 15' is an arm 67 one end of which is rigidly attached at 68 and 69 between the bifurcated members of cam follower 15'. A roller 70 is rotatably mounted at 81 to the other end of arm 67. The end of arm 67 is yoke shaped as can be seen in Fig. 6, to provide a portion for receiving roller 70. Arm 67 has a reduced portion 82 intermediate its two ends which is yieldable and designed to flex when roller 70 is placed under load. Cam follower 15' is provided with openings 83 and 84 to receive pivots similar to pivots 46 and 16 (Fig. 1). Projections 20 are similarly provided on cam follower 15' as in Fig. 1. Arm 67 functions to provide a flexible drive for cam follower 15' when backseating valve shaft head 2' to compensate for the tolerances in the dimensions of the various elements of the drive mechanism.

The valve decreases much of the leakoff, however, some leakoff remains, and must be removed from the valve.

Referring to Fig. 7 there is disclosed one embodiment of the prior art, to handle leakoff.

The prior art device comprises a valve body 113, 113'. Surrounding valve shaft 2 is packing 114, 115, and 116. Packing 115 is provided with a groove in the inner surface and a passage 91 through the packing. Packing 116 is similarly provided with a passage indicated by numeral 92. Surrounding packing 114, 115, and 116 is a pressure bonnet 117. Pressure bonnet 117 is provided with an orifice 118 and an orifice 119. Orifices 118 and 119 communicate with openings 91 and 92 respectively in the packing. A bridge nut 120 surrounding pressure bonnet 117 confines pressure bonnet 117 in valve body 113. A second nut 121 serves to hold the bridge nut in place, and a third nut 127 secures bonnet 117 and valve body 113'.

A pressure area 122 on the outside of pressure bonnet 117 communicates with passage 123 in valve body 113. A second passage 124 which is cut through valve body 113, 113' is also provided. Pressure rings 126 are provided to lessen fluid leakage through passage 125. The admission of pressure in the pressure area 122 on the outside of pressure bonnet 117 and on the outside of nut 120 necessitates the employment of a heavy outside portion of valve body 113. Further, the fluid which leaks through passage 125 to passage 124 necessitates providing a valve body portion 113' with enough material to stand the pressure on the outside of pressure bonnet 117.

Referring to Fig. 1 there is disclosed an improved arrangement for handling the leakoff. Surrounding valve shaft 2 there is packing 85, 86, and 87. Packing 86 has a groove in its outer surface, while the packing designated 87 has a groove in its inner surface which communicates with an opening in the outer surface of the packing. Surrounding the packing is a pressure bonnet member 8. Pressure bonnet 8 confines the leakoff fluid between valve shaft 2 and inner surface 88 of the pressure bonnet. Pressure bonnet 8 has an outer surface 89, a portion (indicated by bracket 31) which is carried in the open portion 1' of valve body 1. Orifices 90 and 100 are provided in the pressure bonnet 8. Orifice 90 communicates with the opening in packing 87 and orifice 100 communicates with the groove in the outer surface of packing 86. A nut 101 is threaded to the pressure bonnet 8, at 102 to confine the packing in the pressure bonnet 8. A nut 103 serves to confine the pressure bonnet in the valve body 1.

Referring to Figs. 1 and 8, a flange 104 is disclosed partially encircling pressure bonnet 8. Flange 104 is bolted to the pressure member through U-bolts 105 which extend through openings 106 in flange 104, and are threaded to nuts 107. The U-bolts provide even pressure in holding the flange to the pressure bonnet. Flange 104 is provided with openings 109, 110 which communicate with orifices 90 and 100 respectively in pressure bonnet 8. Connected to openings 109, 110 are tubes 111. Said tubes are welded at 112 to the flange 104.

As can be seen by comparing the embodiments of the prior art with the arrangement disclosed in Fig. 1, the inventive concept of backseating the valve and confining the leakoff fluid between pressure bonnet 8 and valve shaft 2, eliminates the necessity of providing a heavy body to confine the pressure. The heavy portion 113' of the valve body can be eliminated, the portion 113 has been reduced in size, the elimination of heavy portion 113' permits exposure of the end portion 31, the use of exposed portion 31 permits employment of a removable flange 104 which permits easier inspection, easier maintenance, and easier assembly.

In summary, and referring to Figs. 1, 3, and 4, the device operates in the following manner. Referring to Fig. 1 face 4 on head 2' of valve shaft 2 abuts balance seat 5 and cuts off the flow of fluid from steam chest 9 through the entrance 10 to the turbine. To start the steam flow through the turbine, cam 12 is rotated counterclockwise to engage roller 18 to provide a positive arrangement for moving the valve off of balance seat 5, and to regulate the steam flow. As cam 12 continues to rotate counterclockwise, the valve back face 6 approaches its back seat 7 and the cam moves into engagement with roller 27 which is carried on arm 22, and out of engagement with roller 18. Roller 27 transmits its motion to arm 22 to cause arm 22 to rotate about pivot 23 and compress spring 25; spring 25 in turn reacts against its spring seat 33, and spring seat 33 urges cam follower 15 counterclockwise. Cam follower 15 is pivotally connected to valve shaft 2, through a pivot 46 connected to trunnion carriers 42, which in turn are pivotally connected to trunnions 41, extending from each side of clamp 40 connected to valve shaft 2. As cam follower 15 rotates counterclockwise, clamp 40 on valve shaft 2 is moved upward (Fig. 1) and transmits its motion to the ball 50 carried on the end of the spring rod 49. Spring rod 49 in turn moves the second spring anchor 61 upward to expand spring 63 (spring 63 tends to contract and move the valve shaft head 2' toward seat 5).

As the valve backseats as shown in Fig. 4, spring 25 will permit yielding movement between cam 12 and cam follower 15 to compensate for the tolerances of the elements of the drive device, to provide a firm back seat.

In closing the valve, that is moving the valve downward as viewed in Fig. 1, cam 12 rotates clockwise, and spring 25 expands until arm 22 is once again against stop 26 and no longer follows the cam. Spring 63 then causes the cam follower 15 to follow the cam 12 and move the valve away from its back seat. Sometimes however, the valve sticks to its back seat 7, and spring 63 is ineffective. Abutments 14 are provided on cam 12 and will engage the projections 20 on cam follower 15 and provide a positive means to move cam follower 15 downward, as viewed in Fig. 1, until spring 63 can once more take over and urge valve shaft head 2' toward balance seat 5.

To take care of leakoff when the valve has backseated bonnet 8 confines the fluid between valve shaft 2 and the inner surface 88 of pressure bonnet 8. Pressure bonnet 8 has an outer portion 31 which is not confined by valve body 1 but is exposed, said portion having orifices 90, 100 which are in communication with openings 109, 110 in flange 104 attached to the bonnet 8. Tubes 111 are attached to flange 104 to guide the leakoff fluid from the pressure bonnet 8 to wherever may be desired, for example, to the low pressure turbine, or auxiliary devices employing steam as a motive power.

Although several embodiments of the present invention have been illustrated and described, it will be apparent to one skilled in the art that various changes and modifications may be made therein without departing from the spirit of the invention or from the scope of the appended claims.

It is claimed and desired to secure by Letters Patent:

1. In a cam follower drive: a frame, a cam follower pivotally mounted on the frame, a first roller carried by the cam follower, a rotatable shaft carried on the frame, a cam carried on and rotated by the shaft to engage the first roller and pivot the cam follower, means carried by the frame holding the cam follower in engagement with the cam a second roller resiliently mounted on said cam follower, said second roller positioned on the cam follower to be out of engagement with the cam during a portion of the travel of the cam and in engagement during a different portion of travel of the cam, said cam successively engaging the first roller and then said second roller during the rotation of the cam.

2. A drive comprising: a support, driven movable means mounted on the support, a roller rotatably mounted on the movable means, an arm pivoted to the driven movable means, a stop carried by the movable means, a spring mounted on the movable means and urging the arm to a position in which the arm engages the stop mounted on the movable means, a second roller rotatably mounted on the arm, a cam rotatably mounted on a support, said cam driving the roller rotatably mounted on the driven movable means to provide positive movement of the movable means, and then driving the second roller mounted on the arm to rotate the arm against the spring to provide yieldable movement of the driven movable means, said roller rotatably mounted on the driven movable means and said roller rotatably mounted on the arm positioned to be successively engaged by the cam as the cam moves to different predetermined positions.

3. In a cam follower drive: a support, a cam follower mounted on the support, a first roller mounted on the cam follower, an arm fixedly attached to the cam follower, said arm constructed to flex under load, a second roller, said second roller mounted on the arm, a cam mounted on the support, said cam driving the cam follower first through the first roller affixed to the cam follower to provide positive movement of the cam follower, and then through the second roller affixed to the flexible arm, to provide yieldable movement of the cam follower, said first roller on the cam follower and said second roller on the arm which is carried on the cam follower are positioned so that they will be successively engaged by the cam as the cam follower is moved to different predetermined positions by the cam.

4. In a device for backseating a valve containing a valve shaft having a head reciprocable in a valve body to a back seat; a first cam follower, said first cam follower pivotally attached to the valve body, means interconnecting said first cam follower with said valve shaft to transmit motion to the valve shaft head, a cam carried by the valve body, means connected to the cam to rotate the cam, means connected to the first cam follower urging the first cam follower toward the cam, a second cam follower pivoted to the first cam follower, a spring, one end of the spring abutting the first cam follower and the other end of the spring abutting the second cam follower, a stop on the first cam follower serving to limit the travel of the second cam follower in one direction, said spring biasing said second cam follower against the stop, said first cam follower positioned to be engaged by the cam during a predetermined arc of rotation by the cam to provide positive movement of the valve shaft when translating the valve shaft head toward its back seat, said second cam follower positioned to be engaged by the cam during a different predetermined arc of rotation of the cam as the valve is being backseated, said cam followers are relatively disposed to be successively engaged by said cam, the spring connection between the first cam follower and the second cam follower permitting the second cam follower to move relative to the first cam follower to provide yielding movement when backseating the valve shaft head.

5. In a device for backseating a valve, said valve containing a valve shaft, a valve shaft head and a valve body; a bifurcated cam follower pivotally mounted to the valve body, said cam follower pivotally connected to the valve shaft to transmit motion to the valve shaft head, a spring support extending between the bifurcated members of the cam follower, an arm pivotally mounted between the bifurcated members of the cam follower, a spring engaging the spring suport at one end and the arm at the other end, a stop extending between the bifurcated members of the cam follower, said spring biasing said arm toward said stop, a first cam follower roller rotatably mounted between the bifurcated portions of the cam follower, a second roller rotatably mounted on the end of the arm, a rotatable shaft carried by the valve body, a cam carried on and rotated by the shaft, means urging the cam follower into engagement with the cam, said first cam follower roller positioned adjacent to the end of the cam follower, the second roller carried by the arm positioned intermediate the first cam follower roller and the connection of the cam follower with the valve shaft, said cam engaging the first cam follower roller to provide positive movement for opening the valve, said cam moving out of engagement with the first cam follower roller and into engagement with the second roller on the arm to move the arm against the spring and the spring against the spring support to provide a resilient drive for the cam follower.

6. In a fluid leakoff arrangement for a backseated valve shaft head carried on a valve shaft reciprocable in a valve body having an enclosed and an open portion; a pressure bonnet encircling said valve shaft, said pressure bonnet having an inner and outer surface, a portion of the outer surface of said pressure bonnet in the enclosed portion of said valve body and a portion of said outer surface in the open portion of said valve body, a back seat on one end of said pressure bonnet to be engaged by the valve shaft head, packing material confined between the inner surface of the pressure bonnet and the valve shaft, a plurality of orifices in said portion of the pressure bonnet which is in the open portion of the valve body, a flange member partially engaging the pressure bonnet, means connecting the flange member to the pressure bonnet, openings in said flange member communicating with said orifices in said pressure bonnet, tubes fixed to the openings in said flange to guide fluid leakoff from said flange, said pressure bonnet confining the fluid leakoff between its inner surface and the valve shaft until the leakoff fluid exists through the orifice in the open portion of the valve body.

7. A device as set forth in claim 6, wherein the means which attaches the flange to the pressure bonnet is removable, permitting disassembly of the flange.

8. A device as set forth in claim 6, wherein the flange is removably attached to the pressure bonnet, said means for attaching the flange to the pressure bonnet comprising: U-shaped bolts which extend through openings provided in the corners of the flange, said U-shaped bolts secured to said flange, to provide even pressure in holding said flange to the pressure bonnet.

9. In a device for backseating a valve, having a valve shaft with a head reciprocable against a back seat and a valve body which has an enclosed and an open portion; a first cam follower, said first cam follower pivotally attached to the valve body, means interconnecting said first cam follower with said valve shaft to transmit motion to the valve shaft head, a cam carried by the body, means connected to the cam to rotate the cam, means connected to the first cam follower urging the first cam follower toward the cam, a second cam follower pivoted to the first cam follower, a spring, one end of the spring abutting the first cam follower, the other end of the spring abutting the second cam follower, a stop on the first cam follower serving to limit the travel of the second cam follower, said spring biasing said second cam follower against the stop, said first cam follower positioned to be engaged by the cam during a predetermined arc of rotation by the cam to provide positive movement of the valve shaft when translating the valve shaft head toward its back seat, said second cam follower positioned to be engaged by the cam during a different predetermined arc of rotation of the cam as the valve is being backseated, said cam successively engaging the first cam follower and then the second cam follower, the spring connection between the first cam follower and the second cam follower permitting the second cam follower to move relative to the first cam follower to provide yieldable movement of the valve shaft head, a pressure bonnet encircling said valve shaft, said pressure bonnet having an inner and outer surface, a portion of the outer surface of said pressure bonnet confined in said enclosed portion of said valve body, and a portion of said outer surface in the open portion of said valve body, a back seat on one end of said pressure bonnet to be engaged by the valve shaft head, packing material confined between the inner surface of the pressure bonnet and the valve shaft, a plurality of orifices in said portion of the pressure bonnet which is exposed, a flange member partially engaging the pressure bonnet, means connecting the flange member to the pressure bonnet, openings in said flange member communicating with said orifices in said pressure bonnet, tubes fixed to the openings in said flange to guide the fluid leakoff from said flange, said pressure bonnet confining the leakoff fluid between its inner surface and said valve shaft until the leakoff fluid exits through the orifice in the exposed portion.

References Cited in the file of this patent

UNITED STATES PATENTS

| | | |
|---|---|---|
| 470,184 | Ebi | Mar. 8, 1892 |
| 1,815,134 | Weiner | July 21, 1931 |
| 2,543,102 | Franck | Feb. 27, 1951 |
| 2,663,318 | Lakso | Dec. 22, 1953 |
| 2,739,206 | Florschutz | Mar. 20, 1956 |